(12) United States Patent
Park et al.

(10) Patent No.: US 9,428,600 B2
(45) Date of Patent: Aug. 30, 2016

(54) ELASTIC DIENE TERPOLYMER AND PREPARATION METHOD THEREOF

(71) Applicant: LG CHEM, LTD., Seoul (KR)

(72) Inventors: Sung Ho Park, Daejeon (KR); Sung Cheol Yoon, Daejeon (KR); Sun Keun Kim, Daejeon (KR); Jun Seok Ko, Daejeon (KR); Sang Eun Park, Daejeon (KR); Soo Young Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/442,029

(22) PCT Filed: Jun. 30, 2014

(86) PCT No.: PCT/KR2014/005808
§ 371 (c)(1),
(2) Date: May 11, 2015

(87) PCT Pub. No.: WO2014/209082
PCT Pub. Date: Dec. 31, 2014

(65) Prior Publication Data
US 2016/0137764 A1    May 19, 2016

(30) Foreign Application Priority Data

Jun. 28, 2013 (KR) .......... 10-2013-0075873
Apr. 21, 2014 (KR) .......... 10-2014-0047681
Jun. 27, 2014 (KR) .......... 10-2014-0080041

(51) Int. Cl.
C08F 210/18    (2006.01)
C08F 236/20    (2006.01)
C08F 4/6592    (2006.01)
C08F 4/659    (2006.01)

(52) U.S. Cl.
CPC .......... *C08F 210/18* (2013.01); *C08F 236/20* (2013.01); *C08F 4/6592* (2013.01); *C08F 4/65908* (2013.01)

(58) Field of Classification Search
CPC .. C08F 210/18; C08F 236/20; C08F 4/6592; C08F 4/65908
See application file for complete search history.

(56) References Cited

U.S. PATENT DOCUMENTS

| | | | |
|---|---|---|---|
| 6,369,176 B1 | 4/2002 | Laughner et al. | |
| 2007/0225158 A1 | 9/2007 | Lee et al. | |
| 2012/0108772 A1 | 5/2012 | Lee et al. | |
| 2012/0259077 A1 | 10/2012 | Ha et al. | |

FOREIGN PATENT DOCUMENTS

| | | | |
|---|---|---|---|
| CN | 1150809 | A | 5/1997 |
| CN | 1224433 | A | 7/1999 |
| CN | 1254350 | A | 5/2000 |
| CN | 1432046 | A | 7/2003 |
| CN | 101277987 | A | 10/2008 |
| CN | 101580559 | A | 11/2009 |
| CN | 1011679561 | A | 3/2010 |
| CN | 102482366 | A | 5/2012 |
| EP | 0521908 | B1 | 7/1996 |
| EP | 1 113 028 | B1 | 3/2004 |
| EP | 1237963 | B1 | 9/2004 |
| EP | 2 093 240 | A1 | 8/2009 |
| EP | 2 881 406 | A1 | 6/2015 |
| EP | 2 883 890 | A1 | 6/2015 |
| EP | 2883891 | A1 | 6/2015 |
| EP | 2 902 421 | A1 | 8/2015 |
| EP | 3000832 | A1 | 3/2016 |
| JP | 9-512848 | A | 12/1997 |
| JP | 2005-517068 | A | 6/2005 |
| JP | 2008-527050 | A | 7/2008 |
| JP | 2011-500937 | A | 1/2011 |
| JP | 2012-531503 | A | 12/2012 |
| JP | 2013-510221 | A | 3/2013 |
| KR | 1998-0014912 | B1 | 10/1996 |
| KR | 10-2000-0052136 | A | 8/2000 |
| KR | 10-2001-0020395 | A | 3/2001 |
| KR | 10-2001-0032325 | A | 4/2001 |
| KR | 10-2002-0064334 | A | 8/2002 |
| KR | 10-2002-0091084 | A | 12/2002 |
| KR | 10-0411923 | B1 | 12/2003 |
| KR | 10-0488833 | B1 | 5/2005 |
| KR | 10-0535582 | B1 | 12/2005 |
| KR | 10-2006-0054293 | A | 5/2006 |
| KR | 10-0820542 | B1 | 4/2008 |
| KR | 10-2008-0099529 | A | 11/2008 |

(Continued)

OTHER PUBLICATIONS

"Contributed Lectures" Alexy, et al. Chem. Listy 103, s1-s148 (2009).
"Carbon-13 NMR of Ethylene-1-Olefin Copolymers:Extension to the Short-Chain Branch Distribution in a Low-Density Polyethylene"; Randall; Journal of Polymer Science: Polymeo Physics Edition vol. 11, 275-287 (1973).

(Continued)

*Primary Examiner* — Caixia Lu
(74) *Attorney, Agent, or Firm* — Dentons US LLP

(57) ABSTRACT

The present invention relates to a long-chain branched elastic terpolymer capable of satisfying excellent processability and elasticity (flexibility) at the same time, which is obtained in the presence of a Group IV transition metal catalyst, and a preparation method thereof. The elastic terpolymer is a copolymer of ethylene, an alpha-olefin having 3 to 20 carbon atoms, and a diene, wherein (i) its weight average molecular weight measured by GPC is 100,000 to 500,000, and (ii) x which is an ethylene content (% by weight) and y which is a crystallization temperature (K) of the copolymer measured when the ethylene content is X satisfy a relationship of $2.628x+100 \leq y \leq 2.628x+112$.

17 Claims, 3 Drawing Sheets

(56) References Cited

FOREIGN PATENT DOCUMENTS

| KR | 10-2008-0101542 A | 11/2008 |
| KR | 10-2009-0027212 A | 3/2009 |
| KR | 10-2009-0116737 A | 11/2009 |
| KR | 10-2010-0081485 A | 7/2010 |
| KR | 10-2010-0090714 A | 8/2010 |
| KR | 10-0976131 B1 | 8/2010 |
| KR | 10-2011-0002153 A | 1/2011 |
| KR | 10-2011-0017072 A | 2/2011 |
| KR | 10-2012-0016596 A | 2/2012 |
| KR | 10-2012-010683 A | 9/2012 |
| KR | 10-2012-0101683 A | 9/2012 |
| KR | 10-1237574 B1 | 2/2013 |
| KR | 10-1262305 B1 | 5/2013 |
| KR | 10-2013-0087736 A | 8/2013 |
| KR | 10-2013-0090844 A | 8/2013 |
| KR | 10-1367402 B1 | 2/2014 |
| WO | 2014/000230 A1 | 1/2014 |

OTHER PUBLICATIONS

"Structural Determination of Ethylene-Propylene-DieneRubber (EPDM) Containing High Degree of Controlled Long-Chain Branching" Mitra, et al.; Journal ofAppliedPolymer Science,vol. 113, 2962-2972 (2009) VVC 2009 Wiley Periodicals, Inc.

"13C NMR Determination of Monomer Sequence Distribution inEthylene-Propylene Copolymers Prepared with 6-TiC13-A1( C2H5%) C1" Kakugo, et al.; Macromolecules 1982,15, 1150-1152.

ELASTIC DIENE TERPOLYMER AND PREPARATION METHOD THEREOF

This application is a National Stage Entry of International Application No. PCT/KR2014/005808, filed Jun. 30, 2014, and claims the benefit of Korean Application No. 10-2013-0075873, filed on Jun. 28, 2013, Korean Application No. 10-2014-0047681 filed Apr. 21, 2014, and Korean Application No. 10-2014-0080041 filed Jun. 27, 2014, all of which are hereby incorporated by reference in their entirety for all purposes as if fully set forth herein.

TECHNICAL FIELD

The present invention relates to an elastic terpolymer which is a copolymer of ethylene, an alpha-olefin, and a diene, and a preparation method thereof. More particularly, the present invention relates to an elastic terpolymer capable of satisfying excellent low-temperature properties and elasticity (flexibility) at the same time, and a preparation method thereof.

BACKGROUND OF ART

EPDM rubber, which is an elastic terpolymer of ethylene, an alpha-olefin such as propylene, etc., and a diene such as ethylidene norbornene, etc., has a molecular structure having no unsaturated bond in the main chain, and has superior weather resistance, chemical resistance, and heat resistance to the general conjugated diene rubbers. Owing to these properties, the elastic terpolymers such as EPDM rubber have been used in a wide variety of industrial applications such as automotive part materials, electric wire materials, construction and hoses, gaskets, belts, bumpers, blends with plastics, etc.

Conventionally, the elastic terpolymers such as EPDM rubber have been mainly prepared by copolymerization of three kinds of monomers using a catalyst containing a vanadium compound, for example, a vanadium-based Ziegler-Natta catalyst. However, a large amount of the vanadium-based catalyst is needed because of its low catalytic activity, thereby causing a problem of increasing the content of the metal remaining in the copolymer. Thus, processes for catalyst removal and decolorization are required after preparation of the copolymer, and the residual catalyst in the polymer may cause deterioration of heat resistance, generation of impurities, inhibition of vulcanization, etc. Practically, when the elastic terpolymer is prepared using the catalyst containing the vanadium compound, it is difficult to control the reaction temperature due to the low polymerization activity and low temperature polymerization conditions, and also to control the molecular structure of the copolymer due to difficulties in the control of feeding amounts of comonomers such as propylene and a diene. Accordingly, there has been a limitation in the preparation of the elastic terpolymer having various physical properties by using the vanadium-based catalyst. Due to these problems, a method for preparing the elastic terpolymers such as EPDM rubber using a Group IV metallocene-based transition metal catalyst instead of vanadium-based Ziegler-Natta catalyst has been recently developed.

Since the Group IV transition metal catalyst exhibits high polymerization activity in the olefin polymerization, it is possible to prepare copolymers having a higher molecular weight, and also to easily control the molecular weight distribution and composition of the copolymer. In addition, the catalyst has an advantage that a variety of comonomers can be copolymerized. For example, U.S. Pat. Nos. 5,229,478 and 6,545,088, and Korean Patent No. 0488833 disclose that elastic terpolymers having a high molecular weight can be obtained with excellent polymerization activity by using various metallocene-based Group IV transition metal catalysts obtained from ligands such as cyclopentadienyl, indenyl, fluorenyl, etc.

However, when three kinds of monomers are copolymerized using these conventional Group IV transition metal catalysts, there is a disadvantage that distributions of the repeating units derived from the monomers are not uniform in the copolymer chains due to high reactivity for comonomers of alpha-olefins. As a result, it is difficult to obtain elastic terpolymers such as EPDM rubber having excellent elasticity and flexibility.

Further, U.S. Pat. No. 5,902,867 discloses a method for decreasing viscosity of the polymer by broadening of the molecular weight distribution in order to improve kneading processability and extrusion processability of EPDM. In this case, however, there is a limitation that polymer separation occurs during processing due to low molecular weight components included in the crosslinked rubber product, leading to deterioration of surface properties and low-temperature properties.

Accordingly, there is a continuous demand for a long-chain branched elastic terpolymer capable of satisfying excellent processability and elasticity (flexibility) at the same time, and a preparation method capable of preparing the same with high productivity and yield.

PRIOR ART DOCUMENT

Patent Documents (Patent Document 0001) U.S. Pat. No. 5,229,478
(Patent Document 0002) U.S. Pat. No. 6,545,088
(Patent Document 0003) Korean Patent No. 0488833
(Patent Document 0004) U.S. Pat. No. 5,902,867

DETAILED DESCRIPTION OF THE INVENTION

Technical Problem

Accordingly, the present invention provides an elastic terpolymer capable of satisfying excellent low-temperature properties and elasticity (flexibility) at the same time.

Further, the present invention provides a preparation method of an elastic terpolymer, which is able to prepare the elastic terpolymer with high productivity.

Technical Solution

The present invention provides an elastic terpolymer, in which the elastic terpolymer is a copolymer of ethylene, an alpha-olefin having 3 to 20 carbon atoms, and a diene, obtained in the presence of a Group IV transition metal catalyst, wherein
  i) its weight average molecular weight measured by GPC is 100,000 to 500,000, and
  ii) x which is the ethylene content (% by weight) and y which is the crystallization temperature (K) of the copolymer measured when the ethylene content is X satisfy a relationship of $2.628x+100 \leq y \leq 2.628x+112$.

Further, the present invention provides a method for preparing the elastic terpolymer, including the step of continuously feeding a monomer composition containing 40 to 80% by weight of ethylene, 15 to 55% by weight of an alpha-olefin having 3 to 20 carbon atoms, and 0.5 to 9% by weight of a diene to a reactor to perform copolymerization in the presence of a catalytic composition including a first transition metal compound represented by the following Chemical Formula 1 and a second transition metal compound represented by the following Chemical Formula 2:

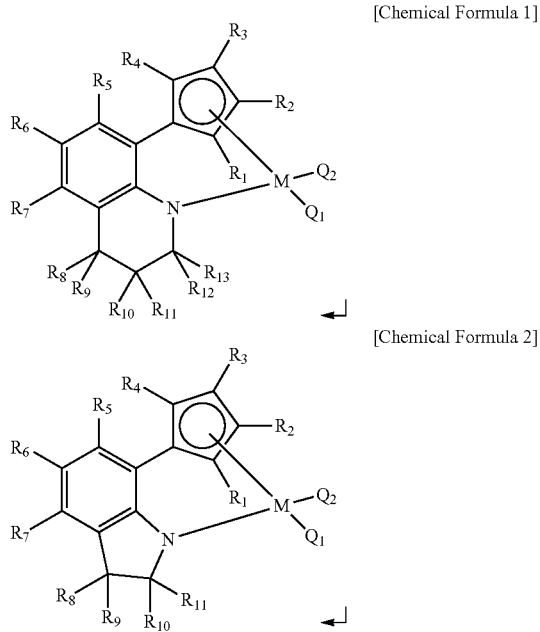

[Chemical Formula 1]

[Chemical Formula 2]

wherein $R_1$ to $R_{13}$ may be the same as or different from each other, and each is independently hydrogen, an alkyl radical having 1 to 20 carbon atoms, an alkenyl radical having 2 to 20 carbon atoms, an aryl radical having 6 to 20 carbon atoms, a silyl radical, an alkylaryl radical having 7 to 20 carbon atoms, an arylalkyl radical having 7 to 20 carbon atoms, or a hydrocarbyl-substituted metalloid radical of a Group IV metal; of $R_1$ to $R_{13}$, two different neighboring groups are connected to each other by an alkylidine radical containing an alkyl having 1 to 20 carbon atoms or an aryl radical having 6 to 20 carbon atoms to form an aliphatic or aromatic ring;

M is a Group IV transition metal; and $Q_1$ and $Q_2$ may be the same as or different from each other, and are each independently a halogen radical, an alkyl radical having 1 to 20 carbon atoms, an alkenyl radical having 2 to 20 carbon atoms, an aryl radical having 6 to 20 carbon atoms, an alkylaryl radical having 7 to 20 carbon atoms, an arylalkyl radical having 7 to 20 carbon atoms, an alkylamido radical having 1 to 20 carbon atoms, an arylamido radical having 6 to 20 carbon atoms, or an alkylidene radical having 1 to 20 carbon atoms.

Hereinafter, an elastic terpolymer and a preparation method thereof will be described in detail according to specific embodiments of the present invention.

First, as used herein, the term "elastic terpolymer" may be defined as follows, unless otherwise specified. The "elastic terpolymer" refers to any elastic copolymer (e.g., a cross-linkable random copolymer) obtained by copolymerization of three kinds of monomers of ethylene, an alpha-olefin having 3 to 20 carbon atoms, and a diene. A representative example of the "elastic terpolymer" is EPDM rubber which is a copolymer of ethylene, propylene, and a diene. However, it is apparent that this "elastic terpolymer" refers to not only the copolymer of the three monomers, but also to any elastic copolymer obtained by copolymerization of one or more monomers belonging to an alpha-olefin and one or more monomers belonging to a diene, together with ethylene. For example, an elastic copolymer obtained by copolymerization of ethylene, two kinds of alpha-olefins of propylene and 1-butene, and two kinds of dienes of ethylidene norbornene and 1,4-hexadiene may also be included in the scope of the "elastic terpolymer", because it is also obtained by copolymerization of three kinds of monomers belonging to ethylene, alpha-olefin, and diene, respectively.

Meanwhile, according to one embodiment of the present invention, the present invention provides an elastic terpolymer, in which the elastic terpolymer is a copolymer of ethylene, an alpha-olefin having 3 to 20 carbon atoms, and a diene, wherein i) its weight average molecular weight measured by GPC is 100,000 to 500,000, and ii) x which is the ethylene content (% by weight) and y which is the crystallization temperature (K) of the copolymer measured when the ethylene content is X satisfy a relationship of $2.628x+100 \leq y \leq 2.628x+112$.

The elastic terpolymer of one embodiment, resulting from copolymerization of three kinds of monomers of ethylene, an alpha-olefin, and a diene within a predetermined content range in the presence of a Group IV transition metal catalyst, has a relatively high weight average molecular weight of approximately 100,000 to 500,000, or approximately 150,000 to 400,000, or 200,000 to 300,000, as measured by GPC. Such high weight average molecular weight is achieved due to excellent activity of a Group IV transition metal catalyst, for example, metallocene-based first and second transition metal compounds of Chemical Formulae 1 and 2, described below. As the elastic terpolymer of one embodiment has such a high molecular weight, the elastic terpolymer, for example, EPDM rubber, exhibits excellent mechanical properties.

Further, in the elastic terpolymer of one embodiment, x which is the ethylene content (% by weight) and y which is the crystallization temperature (K) of the copolymer measured when the ethylene content is X may satisfy a relationship of $2.628x+100 \leq y \leq 2.628x+112$.

The crystallization temperature value with respect to the content of ethylene included in the elastic terpolymer of one embodiment satisfying this relationship may not be very high but is within the optimized range. As such, since the crystallization temperature with respect to the ethylene content in the elastic terpolymer of one embodiment is within the optimized range, the elastic terpolymer is able to satisfy excellent low-temperature properties and have more improved elasticity and flexibility at the same time.

Meanwhile, in the elastic terpolymer of one embodiment, the relationship between the ethylene content, x, and the crystallization temperature, y, can be measured by the following method. First, after the elastic terpolymer is polymerized and prepared, DSC curve data of each copolymer was obtained using, for example, a DSC instrument such as PerkinElmer DSC 6000, etc. This DSC curve data can be obtained by performing DSC analysis while heating each copolymer sample from approximately 0° C. to approximately 100° C. at a rate of approximately 20° C./min, maintaining it at the corresponding temperature for approximately 2 min, and then cooling it to approximately −150° C. at a rate of approximately −10° C./min, for example, as shown in FIGS. 3 and 4. Further, the crystallization temperature can be determined from the obtained DSC curve data, thereby calculating crystallization enthalpy (ΔHc; J/g).

Data for each copolymer is presented by plotting the content of ethylene included in each copolymer on the x axis, and the crystallization temperature value of each copolymer on the y axis, and then linear regression is applied to the data so as to derive the relationship between the ethylene content x and the crystallization temperature y. An example of the relationship between x and y is as illustrated in FIG. 1.

The relationship between x and y in the elastic terpolymer of one embodiment was derived by the method, and as a result, it was found that the elastic terpolymer showed a low crystallization temperature with respect to the ethylene content, compared to the EPDM rubber prepared by a Group IV transition metal catalyst previously used, thereby satisfying the relationship of $2.628x+100 \leq y \leq 2.628x+112$. Therefore, it was confirmed that the elastic terpolymer of one embodiment satisfies excellent low-temperature properties, elasticity, and flexibility at the same time, together with having excellent mechanical properties due to high molecular weight.

Further, the elastic terpolymer of one embodiment may be obtained in the presence of a Group IV transition metal catalyst. In particular, the elastic terpolymer having the above properties can be prepared with, for example, the characteristic high productivity and yield of a Group IV metallocene-based transition metal catalyst, and it has a high molecular weight, thereby satisfying excellent mechanical properties, while satisfying excellent processability, elasticity, and flexibility at the same time by solving the problems of the conventional EPDM rubber prepared by the Group IV metallocene-based transition metal catalyst.

Further, the copolymer of ethylene, an alpha-olefin having 3 to 20 carbon atoms, and a diene may be a copolymer of 40 to 80% by weight or 40 to 70% by weight of ethylene, 15 to 55% by weight of an alpha-olefin having 3 to 20 carbon atoms, and 0.5 to 9% by weight of a diene. This copolymer can be prepared by copolymerization while continuously feeding a monomer composition containing 40 to 80% by weight of ethylene, 15 to 55% by weight of an alpha-olefin having 3 to 20 carbon atoms, and 0.5 to 9% by weight of a diene to a reactor in the presence of a catalytic composition. In particular, as each of the monomers is included at the above ratio, excellent elasticity and flexibility can be achieved.

Further, in the elastic terpolymer of one embodiment, x which is the ethylene content (% by weight) and z which is crystallization enthalpy ($\Delta Hc$; J/g) measured by DSC when the ethylene content is X (% by weight) satisfy a relationship of $1.55x-80.00 \leq z \leq 1.55x-75.00$.

In the elastic terpolymer of one embodiment satisfying this relationship, as the crystallization degree with respect to the ethylene content is within the optimized range, the elastic terpolymer is able to satisfy more improved elasticity and flexibility, together with excellent mechanical properties.

Further, the relationship between the ethylene content x and the crystallization enthalpy z can be derived by calculating the crystallization enthalpy ($\Delta Hc$; J/g) with respect to the ethylene content and then by applying it to linear regression, in the same manner as in the above method for measuring the relationship between the ethylene content x and the crystallization temperature y. An example of the relationship between x and z is as illustrated in FIG. 2.

Further, the elastic terpolymer of one embodiment satisfies the property that Re*Rc is less than approximately 1, for example, approximately 0.50 to 0.99, in which Re*Rc is a product of a reactivity ratio Re representing the distribution of ethylene in the copolymer and a reactivity ratio Rc representing the distribution of the alpha-olefin in the copolymer.

In this property, Re=k11/k12 and Rc=k22/k21, where k11 is a growth reaction rate constant when ethylene binds next to ethylene in the copolymer chain, k12 is a growth reaction rate constant when alpha-olefin binds next to ethylene in the copolymer chain, k21 is a growth reaction rate constant when ethylene binds next to alpha-olefin in the copolymer chain, and k22 is a growth reaction rate constant when alpha-olefin binds next to alpha-olefin in the copolymer chain.

Further, each growth reaction rate constant of k11, k12, k21, and k22 can be measured by analyzing each copolymer using $^{13}$C-NMR, for example, the Re*Rc value can be obtained from the results of $^{13}$C-NMR analysis by Triad Sequence analysis according to the Randall method [Journal of Polymer Science: Polymer Physics edition, 1973, 11, 275~287] and the Kakugo method [Macromolecules 1982, 15, 1150].

The Re*Rc value of less than approximately 1 indicates that the probability of binding of alpha-olefin next to ethylene in the copolymer chain is high, and the probability of binding of ethylene next to alpha-olefin in the copolymer chain is high, and thus the copolymer chain has an alternate distribution of ethylene and alpha-olefin. In contrast, if the Re*Rc value is approximately 1, the copolymer chain may have a random distribution between the monomers of ethylene and alpha-olefin. If the Re*Rc value is greater than approximately 1, homogeneous monomers bind to each other and therefore the copolymer chain may be in the form of a block copolymer.

As the elastic terpolymer of one embodiment has the Re*Rc value of less than approximately 1, for example, approximately 0.50 to 0.99, this copolymer exhibits the property of uniform alternate distribution of the monomers, thereby exhibiting superior elasticity and flexibility which are required in EPDM rubbers, etc.

Further, the elastic terpolymer of one embodiment may have a density range capable of satisfying the physical properties suitable as EPDM rubber, for example, a density of approximately 0.840 to 0.895 g/cm$^3$, or approximately 0.850 to 0.890 g/cm$^3$.

Further, the elastic terpolymer of one embodiment may have a Mooney viscosity (1+4@125° C.) range capable of satisfying physical properties suitable as EPDM rubber, for example, a Mooney viscosity of approximately 1 MU to 180 MU, or approximately 5 MU to 150 MU, or approximately 20 MU to 130 MU. The Mooney viscosity (1+4@125° C.) can be measured in accordance with ASTM D1646-04 using a Monsanto alpha 2000 instrument. If the Mooney viscosity is less than 20 MU, there is no difference in processability according to long chain branching, and if the Mooney viscosity is more than 130 MU, the preparation by the present invention is possible, but polymer productivity is decreased due to high viscosity, which is not beneficial in economic aspects.

Further, in the elastic terpolymer of one embodiment, the alpha-olefin may be one or more alpha-olefins having 3 to 20 carbon atoms such as propylene, 1-butene, 1-hexene, 1-octene, 1-pentene, 4-methyl-1-pentene, 1-hexene, 1-heptene, 1-decene, 1-undecene, 1-dodecene, 1-tridecene, 1-tetradecene, 1-pentadecene, 1-hexadecene, 1-heptadecene, 1-nonadecene, 9-methyl-1-decene, 11-methyl-1dodecene, 12-ethyl-1-tetradecene, etc. Of them, alpha-olefins having 3 to 10 carbon atoms, such as representative examples of propylene, 1-butene, 1-hexene, or 1-octene, may be properly used.

Further, a non-conjugated diene-based monomer may be used as the diene. Specific examples thereof may include 5-1,4-hexadiene, 1,5-heptadiene, 1,6-octadiene, 1,7-nonadiene, 1,8-decadiene, 1,12-tetradecadiene, 3-methyl-1,4-hexadiene, 4-methyl-1,4-hexadiene, 5-methyl-1,4-hexadiene, 4-ethyl-1,4 hexadiene, 3,3-dimethyl-1,4-hexadiene, 5-methyl-1,4-heptadiene, 5-ethyl-1,4-heptadiene, 5-methyl- 1,5-heptadiene, 6-methyl-1,5-heptadiene, 5-ethyl-1,5-heptadiene, 4-methyl 1,4-octadiene, 3-methyl 1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 7-methyl-1,6-octadiene, 4-methyl-1,4-nonadiene, ethylidene-2-norbornene, 5-methylene-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-buteny)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene, 5-propylidene-2-norbornene, 5-isopropylidene-2-norbornene, 5-butylidene-2-norbornene, 5-isobutylidene-2-norbornene, 2,3-diisopropylidene-5-norbornene, 2-ethylidene-3-isopropylidene-5-norbornene, and 2-propenyl-2,2-norbornadiene, and one or more dienes selected therefrom may be used.

Of the dienes, in particular, 5-ethylidene-2-norbornene, 5-methylene-2-norbornene, or 4-hexadiene may be properly used to prepare the elastic terpolymer, which satisfies the weight average molecular weight and LCB Index of one embodiment. Meanwhile, 5-vinyl-2-norbornene (VNB) or dicyclopentadiene (DCPD) which has been used as the diene in the conventional preparation of the elastic terpolymer has two double bonds, which participate in polymerization reaction to show a crosslinked polymer structure. Therefore, there are limitations that gel particles are formed during polymerization, or it is difficult to control the molecular weight of the copolymer and also difficult to control the polymerization reaction.

Meanwhile, according to another embodiment of the present invention, provided is a method for preparing the above-described elastic terpolymer of one embodiment. The preparation method of the copolymer may include the step of continuously feeding a monomer composition containing 40 to 80% by weight of ethylene, 15 to 55% by weight of an alpha-olefin having 3 to 20 carbon atoms, and 0.5 to 9% by weight of a diene to a reactor to perform copolymerization in the presence of a catalytic composition including a first transition metal compound represented by the following Chemical Formula 1 and a second transition metal compound represented by the following Chemical Formula 2:

[Chemical Formula 1]

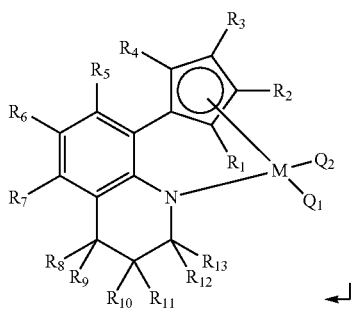

[Chemical Formula 2]

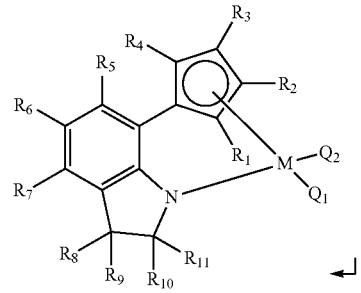

wherein $R_1$ to $R_{13}$ may be the same as or different from each other, and are each independently hydrogen, an alkyl radical having 1 to 20 carbon atoms, an alkenyl radical having 2 to 20 carbon atoms, an aryl radical having 6 to 20 carbon atoms, a silyl radical, an alkylaryl radical having 7 to 20 carbon atoms, an arylalkyl radical having 7 to 20 carbon atoms, or a hydrocarbyl-substituted metalloid radical of a Group IV metal; of $R_1$ to $R_{13}$, two different neighboring groups are connected to each other by an alkylidine radical containing an alkyl having 1 to 20 carbon atoms or an aryl radical having 6 to 20 carbon atoms to form an aliphatic or aromatic ring;

M is a Group IV transition metal; and $Q_1$ and $Q_2$ may be the same as or different from each other, and are each independently a halogen radical, an alkyl radical having 1 to 20 carbon atoms, an alkenyl radical having 2 to 20 carbon atoms, an aryl radical having 6 to 20 carbon atoms, an alkylaryl radical having 7 to 20 carbon atoms, an arylalkyl radical having 7 to 20 carbon atoms, an alkylamido radical having 1 to 20 carbon atoms, an arylamido radical having 6 to 20 carbon atoms, or an alkylidene radical having 1 to 20 carbon atoms.

As confirmed in the following examples, etc., while predetermined amounts of monomers, that is, approximately 40 to 80% by weight or approximately 40 to 70% by weight of ethylene, approximately 15 to 55% by weight of an alpha-olefin having 3 to 20 carbon atoms, and approximately 0.5 to 9% by weight of a diene are used, each of the monomers is prepared by a continuous polymerization process in the presence of the transition metal catalyst of Chemical Formula 1 or 2 to obtain the elastic terpolymer of one embodiment satisfying the above-described particular relationship between the ethylene content and the crystallization temperature in a high yield and productivity.

This is mainly attributed to excellent catalytic activities of the two kinds of particular catalysts and reactivities of the comonomers. The particular catalysts of the first and second transition metal compounds exhibit excellent catalytic activities as Group IV transition metal catalysts, and in particular, they exhibit excellent selectivity and copolymerization reactivity for comonomers such as alpha-olefins and dienes. Moreover, by using these two kinds of particular catalysts, copolymerization is allowed to occur while a relatively high content of diene is uniformly distributed in the polymer chains. It seems that this is because the particular catalysts of Chemical Formulae 1 and 2 very stably maintain rigid five- and six-membered ring structures around metals by a quinoline-based amido group, and therefore they have a structural characteristic accessible by the monomers. That is, based on the above-described structural characteristics of the catalysts, the particular catalysts of Chemical Formulae 1 and 2 are able to form a long-chain branched macromer having double bonds during copolymerization of ethylene and alpha-olefin, in turn, which is copolymerized by reaction with the catalysts to form a long-chain branched elastic terpolymer.

Moreover, using the two kinds of the particular catalysts of the first and second transition metal compounds, copolymerization is performed in a continuous manner while continuously feeding a monomer composition containing the monomers to a polymerization reactor, resulting in more uniform distribution of the comonomer, in particular, the diene, in the polymer chains.

As a result, a long-chain branched elastic terpolymer having a high molecular weight, in which the monomers are alternately distributed, can be prepared with high productivity and yield. In the elastic terpolymer thus obtained, the crystallization temperature with respect to the ethylene content is not high but is optimized, owing to the property of the uniform alternate distribution of the monomers, thereby satisfying the above-described property of one embodiment, for example, the relationship between the ethylene content x and the crystallization temperature y of $2.628x+100 \leq y \leq 2.628x+112$, or Re*Rc of less than 1.

Therefore, according to the preparation method of another embodiment, the above described elastic terpolymer of one embodiment can be prepared with high productivity and yield, and this elastic terpolymer satisfies excellent mechanical properties and more improved elasticity at the same time to be very preferably used as the EPDM rubber prepared by Group IV transition metal catalysts.

However, if the above-described two kinds of particular catalysts are not used, or only one of them is used, or if the content of each monomer, in particular, the content of the diene is out of the above-described proper range, the final elastic terpolymer may not satisfy the high molecular weight range of one embodiment or the ethylene content and the crystallization temperature may not satisfy the particular relationship.

Meanwhile, for the above-described preparation method of the elastic terpolymer of another embodiment, a more detailed description of the first and second transition metal compounds represented by Chemical Formulae 1 and 2 will be given below.

First, in Chemical Formulae 1 and 2, hydrocarbyl refers to the monovalent moiety obtained upon removal of a hydrogen atom from a hydrocarbon, and for example, it encompasses an alkyl group such as ethyl, etc., or an aryl group such as phenyl, etc.

Further, in Chemical Formulae 1 and 2, metalloid means a semi-metal having properties of both a metal and a non-metal, and refers to arsenic, boron, silicon, tellurium, or the like. M refers to, for example, a Group IV transition metal element such as titanium, zirconium, hafnium, or the like.

Of these first and second transition metal compounds, the first transition metal compound of Chemical Formula 1 may be properly one or more selected from the group consisting of the following compounds:

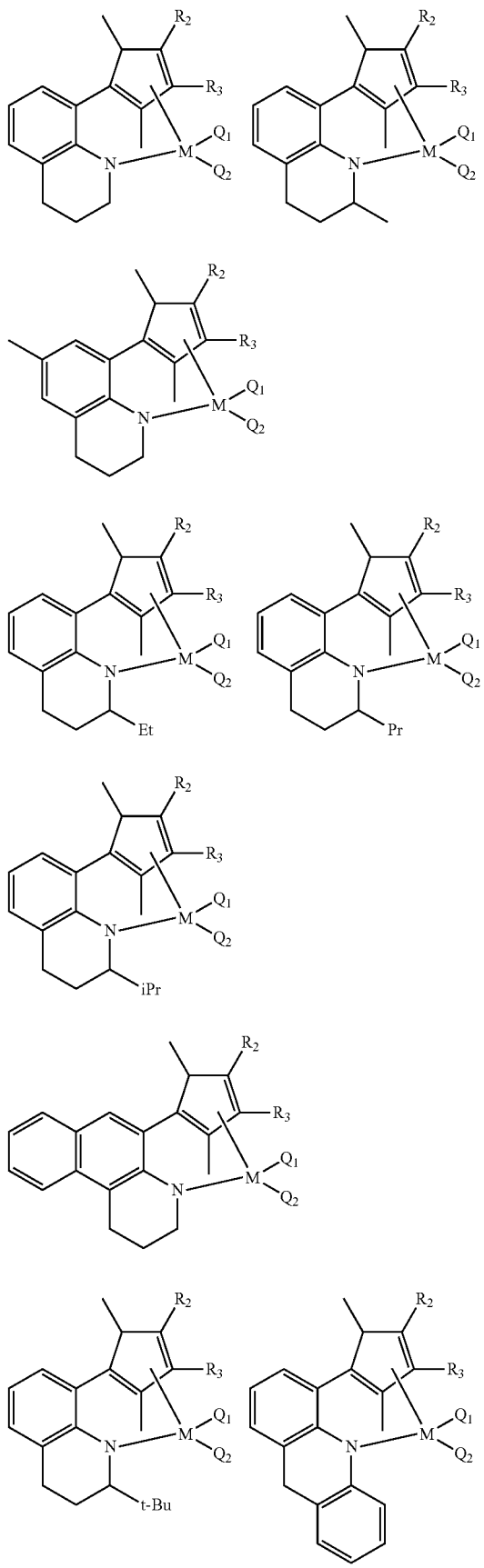

-continued

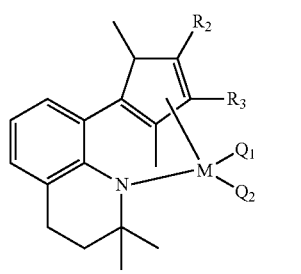

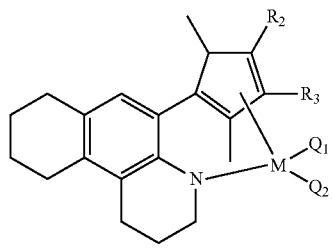

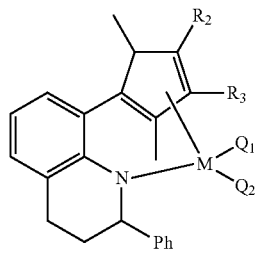

wherein $R_2$ and $R_3$ are the same as or different from each other and are each independently hydrogen or a methyl radical, M is a Group IV transition metal, and $Q_1$ and $Q_2$ are the same as or different from each other and are each independently a methyl radical, a dimethylimido radical, or a chlorine radical.

Further, the second transition metal compound of Chemical Formula 2 may be properly one or more selected from the group consisting of the following compounds:

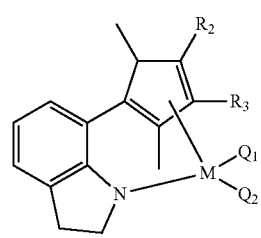 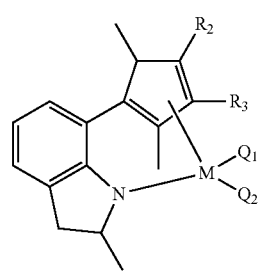

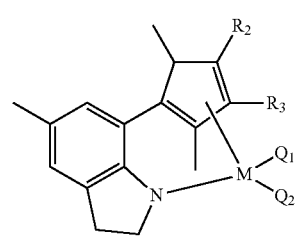

-continued

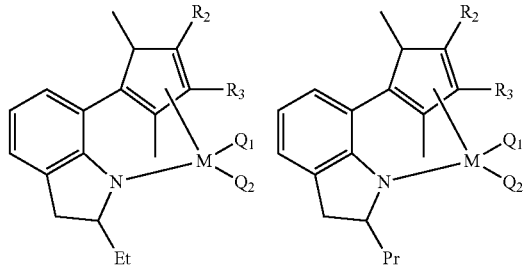

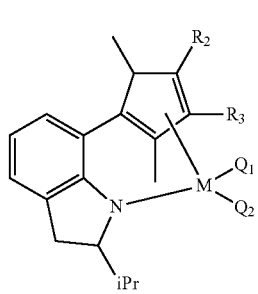

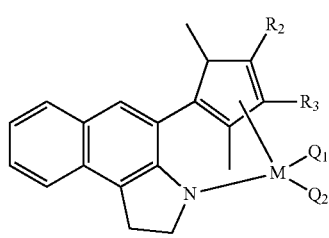

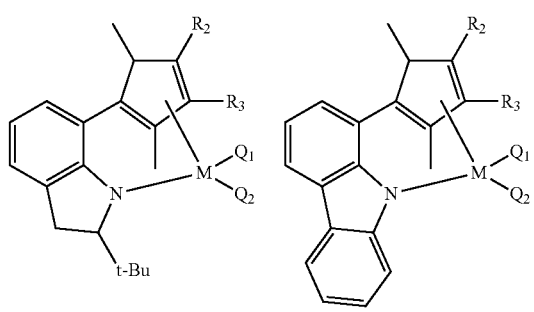

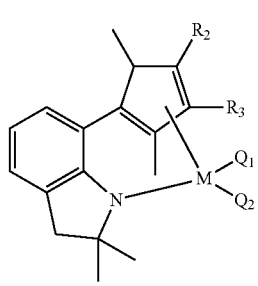

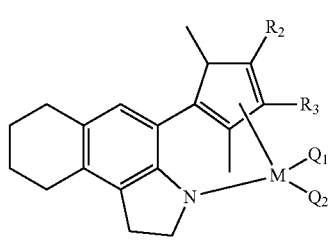

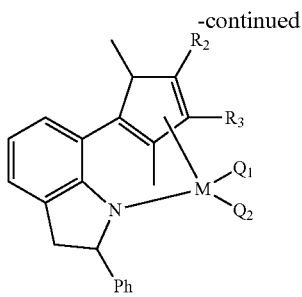

wherein $R_2$ and $R_3$ are the same as or different from each other, and are each independently hydrogen or a methyl radical, M is a Group IV transition metal, and $Q_1$ and $Q_2$ same as or different from each other and are each independently a methyl radical, a the same as or different from each other and are each independently a methyl radical, a dimethylimido radical, or a chlorine radical.

Meanwhile, the catalytic composition used in the preparation method of another embodiment may further include one or more co-catalytic compounds selected from the group consisting of the following Chemical Formula 3, Chemical Formula 4, and Chemical Formula 5, in addition to the above-described first and second transition metal compounds:

$$—[Al(R)—O]_n—$$ [Chemical Formula 3]

wherein R's are the same as or different from each other and are each independently halogen, a hydrocarbon having 1 to 20 carbon atoms, or a halogen-substituted hydrocarbon having 1 to 20 carbon atoms, and n is an integer of 2 or more;

$$D(R)_3$$ [Chemical Formula 4]

wherein R is the same as defined in Chemical Formula 3, and D is aluminum or boron; and $$[L-H]^+[ZA_4]^- \text{ or } [L]^+[ZA_4]^+$$ [Chemical Formula 5]

wherein L is a neutral or cationic Lewis acid, H is a hydrogen atom, Z is an element of Group 13, and A's are the same as or different from each other and are each independently an aryl group having 6 to 20 carbon atoms or an alkyl group having 1 to 20 carbon atoms, in which one or more hydrogen atoms are unsubstituted or substituted with a halogen, a hydrocarbon having 1 to 20 carbon atoms, an alkoxy, or a phenoxy.

In the co-catalytic compound, examples of the compound represented by Chemical Formula 3 may include methylaluminoxane, ethylaluminoxane, isobutylaluminoxane, butylaluminoxane, or the like.

Further, examples of the compound represented by Chemical Formula 4 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminummethoxide, trimethylbhoron, triethylboron, triisobutylboron, tripropylboron, tributylboron, or the like, and of them, trimethylaluminum, triethylaluminum, or triisobutylaluminum may be properly used.

The compound represented by Chemical Formula 5 may include a non-coordinating anion compatible with a cation as the Bronsted acid. Preferred anions are those containing a single coordination complex having a large size and a semi-metal. In particular, compounds containing a single boron atom in the anion portion are widely used. In this regard, salts containing anions including a coordination complex containing a single boron atom are preferably used as the compound represented by Chemical Formula 5.

As specific examples thereof, examples of trialkylammonium salts may include trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(2-butyl)ammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-triisopropylsilyl)-2,3,5,6-tetrafluorophenyl)borate, N,N-dimethylanilinium pentafluorophenoxytris(pentafluorophenyl)borate, N,N-diethylanilinium tetrakis(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-2,4,6-trimethylanilinium tetrakis(2,3,4,6-tetrafluorophenyl)borate, decyldimethylammonium tetrakis(pentafluorophenyl)borate, dodecyldimethylammonium tetrakis(pentafluorophenyl)borate, tetradecyldimethylammonium tetrakis(pentafluorophenyl)borate, hexadecyldimethylammonium tetrakis(pentafluorophenyl)borate, octadecyldimethylammonium tetrakis(pentafluorophenyl)borate, eicosyldimethylammonium tetrakis(pentafluorophenyl)borate, methyldidecylammnonium tetrakis(pentafluorophenyl)borate, methyldidodecylammonium tetrakis(pentafluorophenyl)borate, methylditetradecylammonium tetrakis(pentafluorophenyl)borate, maethyldihexadecylammonium tetrakis(pentafluorophenyl)borate, methyldioctadecylammonium tetrakis(pentafluorophenyl)borate, methyldieicosylammonium tetrakis(pentafluorophenyl)borate, tridecylaunmonium tetrakis(pentafluorophenyl)borate, tridodecylammonium tetrakis(pentafluorophenyl)borate, tritetradecylammonium tetrakis(pentafluorophenyl)borate, trihexadecylammonium tetrakis(pentafluorophenyl)borate, trioctadecylammonium tetrakis(pentafluorophenyl)borate, trieicosylammonium tetrakis(pentafluorophenyl)borate, decyldi(n-butyl)ammonium tetrakis(pentafluorophenyl)borate, dodecyldi(n-butyl)ammonium tetrakis(pentafluorophenyl)borate, octadecyldi(n-butyl)ammonium tetrakis(pentafluorophenyl)borate, N,N-didodecylanilinium tetrakis(pentafluorophenyl)borate, N-methyl-N-dodecylanilinium tetrakis(pentafluorophenyl)borate, methyldi(dodecyl)ammonium tetrakis(pentafluorophenyl)borate, or the like.

Further, examples of dialkylammonium salts may include di-(i-propyl)ammonium tetrakis(pentafluorophenyl)borate, dicyclohexylammonium tetrakis(pentafluorophenyl)borate, or the like.

Further, examples of carbonium salts may include tropylium tetrakis(pentafluorophenyl)borate, triphenylmethylium tetrakis(pentafluorophenyl)borate, benzene(diazonium) tetrakis(pentafluorophenyl)borate, or the like.

Meanwhile, in the above-described preparation method of the elastic terpolymer, the catalytic composition containing the above-described first and second transition metal compounds, and optionally the co-catalytic compound may be prepared by, for example, a method including the steps of contacting the first and second transition metal compounds with the co-catalytic compound of Chemical Formula 3 or Chemical Formula 4 to prepare a mixture; and adding the co-catalytic compound of Chemical Formula 5 to the mixture.

Further, in the catalytic composition, a molar ratio of the first transition metal compound to the second transition metal compound may be approximately 10:1 to 1:10, a molar ratio of the total transition metal compound of the first and second transition metal compounds to the co-catalytic compound of Chemical Formula 3 or Chemical Formula 4 may be approximately 1:5 to 1:500, and a molar ratio of the total transition metal compound to the co-catalytic compound of Chemical Formula 5 may be approximately 1:1 to 1:10.

Further, in the preparation method of the elastic terpolymer, the catalytic composition may additionally include a reaction solvent, and examples of the reaction solvent may include hydrocarbon-based solvents such as pentane, hexane, or heptane, etc., or aromatic solvents such as benzene, toluene, etc., but are not limited thereto.

As described above, alpha-olefin contained in the monomer composition may include propylene, 1-butene, 1-hexene, 1-octene, 1-pentene, 4-methyl-1-pentene, 1-hexene, 1-heptene, 1-decene, 1-undecene, 1-dodecene, or the like, and as the diene, a non-conjugated diene-based monomer may be used. Of them, as the monomers typically used in the preparation of EPDM rubber, for example, propylene as the alpha-olefin and a non-conjugated diene-based monomer such as 5-ethylidene-2-norbornene, 1,4-hexadiene, or dicyclopentadiene as the diene, may be properly used.

Further, in the above-described preparation method of the copolymer of another embodiment, the copolymerization step may be performed at a temperature of approximately 100 to 170° C., or at a temperature of approximately 100 to 160° C. If the copolymerization temperature is too low, it is difficult to prepare an elastic terpolymer in which the three kinds of monomers are alternately distributed uniformly. If the polymerization temperature is too high, thermal decomposition of the monomers or the prepared copolymer may occur. Further, copolymerization may be performed by solution polymerization, in particular, by a continuous solution polymerization method. In this regard, the above-described catalytic composition may be dissolved in the solution, and thus used in the form of homogeneous catalyst.

For the continuous solution polymerization, the copolymerization step may be performed by continuously feeding the above-described monomer composition, the catalytic composition containing the first and second transition metal compounds, and optionally the cocatalyst in the solution state to a reactor, and the copolymerization step may be continuously performed by continuously discharging the copolymerized elastic terpolymer from the reactor.

By this continuous solution polymerization, a long-chain branched elastic terpolymer can be more effectively obtained with high productivity and yield.

Advantageous Effects

According to the present invention, as described above, an elastic terpolymer which has excellent low-temperature properties and more improved elasticity and flexibility to be very preferably used as EPDM rubber can be prepared.

Further, according to the present invention, a method for preparing a copolymer capable of preparing the elastic terpolymer with high productivity and yield.

Since the elastic terpolymer obtained according to the present invention overcomes the limitations of the previously known EPDM rubber which is prepared by a Group IV metallocene-based transition metal catalyst, and satisfies excellent low-temperature properties, elasticity, and flexibility as well as other physical properties, it can be very preferably used as EPDM rubber while bringing out the characteristic advantage of the Group IV transition metal catalyst.

DETAILED DESCRIPTION OF THE EMBODIMENTS

Figure 1:
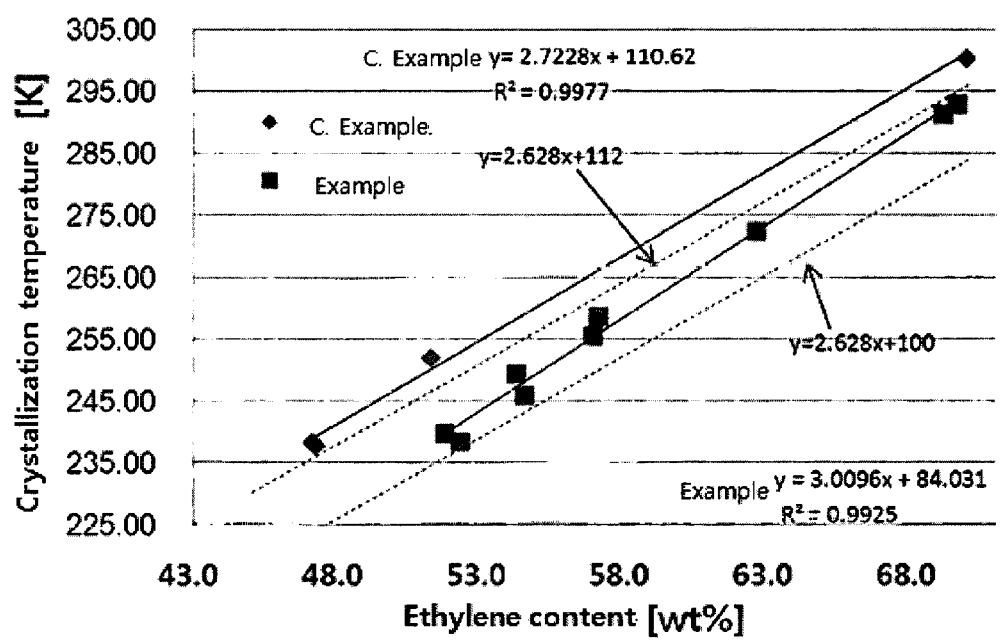
FIG. 1 is a graph showing the relationship between the ethylene content and the crystallization temperature for elastic terpolymers prepared in examples and comparative examples.

The present invention will be described in more detail in the following examples. However, these examples are for illustrative purposes only and are not intended to limit the scope of the present invention.

<Synthesis of Ligand and Transition Metal Compound>

Synthesis of all ligands and catalysts was performed by standard Schlenk and glovebox techniques under a nitrogen atmosphere to avoid contact with air and moisture, and organic reagents and solvents used in reactions were purchased from Sigma-Aldrich and Merck and purified by a standard method before use. The structures of the synthesized ligands and catalysts were confirmed by 400 MHz Nuclear Magnetic Resonance (NMR) Spectroscopy and X-ray Spectroscopy.

In the following examples, as first and second transition metal compounds, [(1,2,3,4-tetrahydroquinolin-8-yl)tetramethylcyclopentadienyl-eta5,kapa-N]titanium dimethyl and [(2-methylindolin-7-yl)tetramethylcyclopentadienyl-eta5, kapa-N]titanium dimethyl were used, respectively. As a co-catalytic compound, N,N-dimethylanilinium tetrakis(pentafluorophenyl)borate and triisobutylaluminum were used. The first and second transition metal compounds were prepared and used in the same manner as in Examples 2 and 14 of Korean Patent No. 0,976,131, and the co-catalytic compound was prepared and used in the same manner as in Example 9 of Korean Patent No. 0,820,542.

EXAMPLES 1 to 9

Preparation of Elastic Terpolymer of Ethylene, Propylene, and 5-ethylidene-2-norbornene Terpolymerization of ethylene, propylene, and 5-ethylidene-2-norbornene was continuously performed using a 2 L-pressure reactor. Hexane as a polymerization solvent was continuously fed to the bottom of the reactor at a feed rate of 7.6 kg per hour, and the polymerization solution was continuously discharged from the top of the reactor.

As the first and second transition metal compounds, the above-described [(1,2,3,4-tetrahydroquinolin-8-yl)tetramethylcyclopentadienyl-eta5,kapa-N]titanium dimethyl and [(2-methylindolin 7 yl)tetramethylcyclopentadienyl-eta5, kapa-N]titanium dimethyl dissolved in hexane were used, and fed to the reactor at a rate of 51 to 54 µmol per hour. Further, as the co-catalytic compound, the above-described N,N-dimethylanilinium tetrakis(pentafluorophenyl)borate dissolved in toluene was used, and fed to the reactor at a rate of 255 to 270 µmol per hour. Further, as the additional co-catalytic compound, the above-described triisobutylaluminum dissolved in hexane was used, and fed to the reactor at a rate of 4080 to 4200 µmol per hour.

As the monomers, ethylene at a rate of 950 g per hour, propylene at a rate of 820 to 950 g per hour, and 5-ethylidene-2-norbornene at a rate of 86 to 129 g per hour were continuously fed to the reactor to perform the copolymerization.

The copolymerization temperature in the reactor was controlled between 120 to 140° C. while 0.5 mL/min of the feed rate of 5-ethylidene-2-norbornene was increased from 1 mL/min at around 140° C.

Under the above-described conditions, copolymerization was performed by continuous solution polymerization to prepare elastic terpolymers of Examples 1 to 9 in the form of homogeneous solution in a continuous manner, and the polymerization solutions continuously discharged from the top of the reactor were dried under reduced pressure in a 60° C. vacuum oven after termination of the polymerization reaction under ethanol, and finally, copolymers of Examples 1 to 9 were prepared.

COMPARATIVE EXAMPLES 1 to 4

Commercialized Elastic Terpolymer of Ethylene, Propylene, and 5-ethylidene-2-norbornene 4520, 4570, 4640, and 4770 of DOW, which are commercialized EPDM rubbers known to be prepared by the metallocene catalyst, were used as elastic terpolymers of Comparative Examples 1~4, respectively.

The content of each monomer in the copolymers thus obtained is the same as summarized in the following Table 1. In this regard, the content of each monomer was measured using Bruker 600 MHz Avance II HD NMR. At this time, the temperature was 373 K and an ODCB-d4 solution was used for $^1$H NMR measurement of the samples.

TABLE 1

| | Ethylene wt % | Propylene wt % | 5-ethylidene-2-norbornene wt % |
|---|---|---|---|
| Example 1 | 51.7 | 43.4 | 4.9 |
| Example 2 | 52.2 | 44.3 | 3.5 |
| Example 3 | 54.2 | 40.5 | 5.3 |
| Example 4 | 54.5 | 42.0 | 3.5 |
| Example 5 | 56.9 | 35.0 | 8.1 |
| Example 6 | 57.1 | 35.1 | 7.8 |
| Example 7 | 62.6 | 32.0 | 5.4 |
| Example 8 | 69.1 | 25.9 | 5.0 |
| Example 9 | 69.6 | 25.0 | 8.8 |
| Comparative Example 1 | 47.1 | 47.3 | 5.6 |
| Comparative Example 2 | 47.2 | 47.5 | 5.3 |
| Comparative Example 3 | 51.2 | 436. | 5.2 |

TABLE 1-continued

| | Ethylene wt % | Propylene wt % | 5-ethylidene-2-norbornene wt % |
|---|---|---|---|
| Comparative Example 4 | 69.9 | 25.0 | 5.1 |

EXPERIMENTAL EXAMPLE 1

Figure 3:
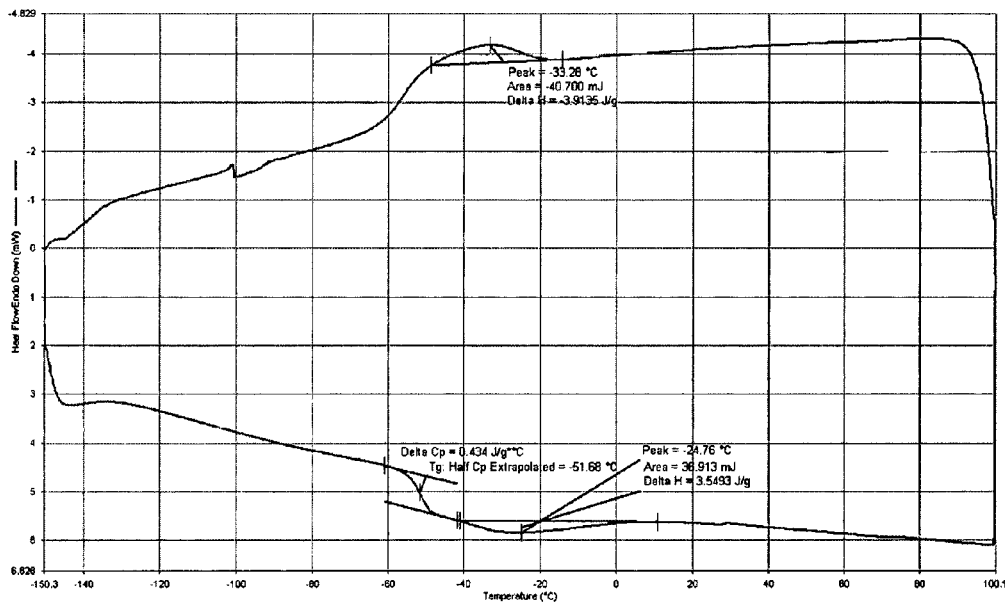
FIG. 3 shows DSC curve data of the elastic terpolymer prepared in Example 2.
Figure 4:
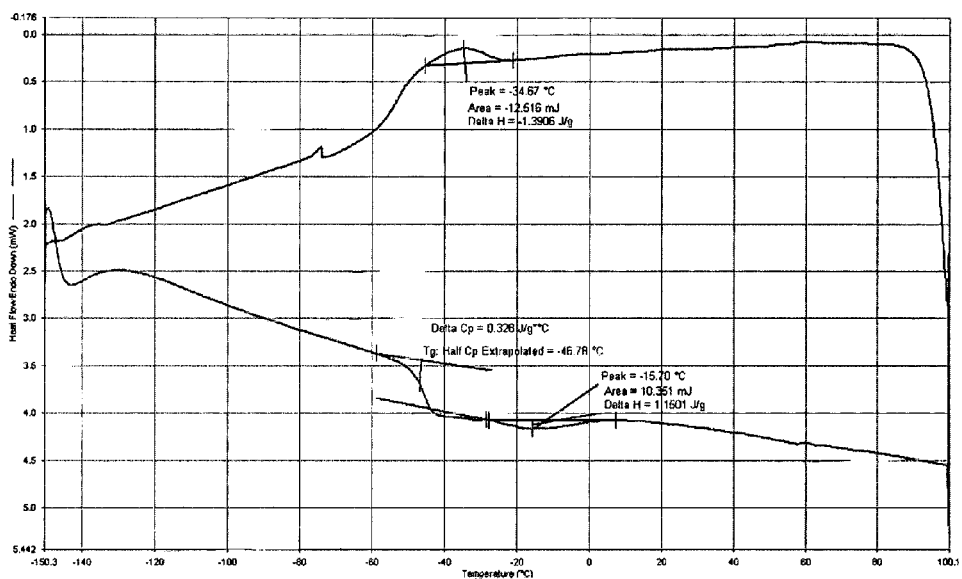
FIG. 4 shows DSC curve data of the elastic terpolymer prepared in Comparative Example 1.

Measurement of Crystallization Temperature and Enthalpy, and Derivation of Relationship Between Ethylene Content and Crystallization Temperature or Crystallization Enthalpy DSC curve data of the copolymers of the examples and comparative examples was obtained using a DSC instrument of PerkinElmer DSC 6000. More specifically, DSC analysis was performed while heating each copolymer sample from approximately 0° C. to approximately 100° C. at a rate of approximately 20° C./min, maintaining it at approximately 100° C. for approximately 2 min, and then cooling it to approximately −150° C. at a rate of approximately −10° C./min. The obtained DSC curve data of Example 2 and Comparative Example 1 are shown as in FIGS. 3 and 4.

Crystallization temperature (Tc; K) and crystallization enthalpy (ΔHc; J/g) of each copolymer were calculated from the DSC curve data, and are summarized in the following Table 2.

(1) Data for each copolymer is presented by plotting the content of ethylene included in each copolymer of the examples on the x axis, and the crystallization temperature value of each copolymer on the y axis, and then linear regression is applied to the data so as to derive the relationship between the ethylene content, x, and the crystallization temperature, y. This relationship is shown as in FIG. 1, and for comparison with the examples, data of Comparative Examples 1 and 2 are also shown in FIG. 1.

Figure 2:
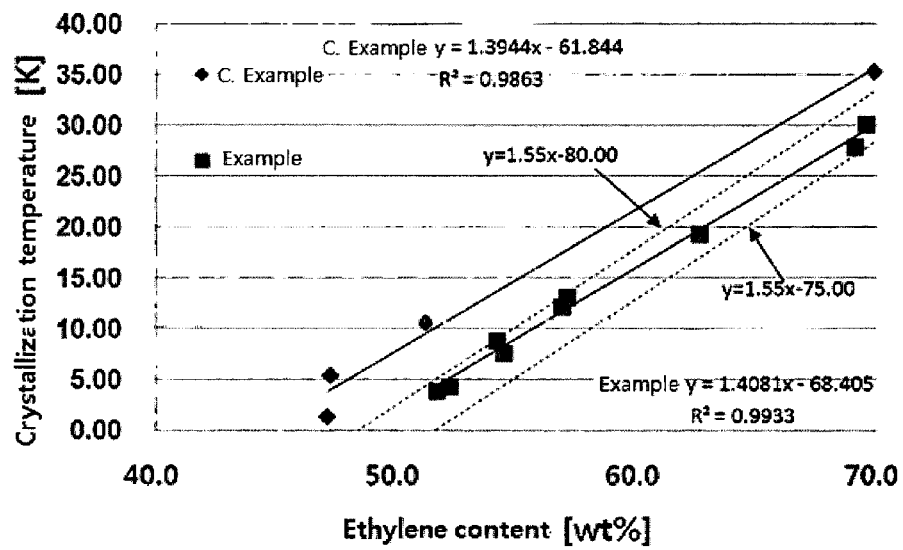
FIG. 2 is a graph showing the relationship between the ethylene content and the crystallization enthalpy for elastic terpolymers prepared in examples and comparative examples.

(2) Data for each copolymer is presented by plotting the content of ethylene included in each copolymer of the examples on the x axis, and the crystallization enthalpy of each copolymer on the y axis, and then linear regression is applied to the data so as to derive the relationship between the ethylene content, x, and the crystallization enthalpy, z. This relationship is shown in FIG. 2, and for comparison with the examples, data of Comparative Examples 1 and 2 are also shown in FIG. 2.

EXPERIMENTAL EXAMPLE 2

Measurement of Re*Rc

Each copolymer of the examples and comparative examples was analyzed by $^{13}$C-NMR to obtain a growth reaction rate constant of k11, k12, k21, or k22. In this regard, a 600 MHz Bruker DRX 600 instrument was used for measurement, and each copolymer dissolved in ortho-dichlorobenzene-d4 solution was analyzed at 100° C.

Each growth reaction rate constant can be obtained from the results of $^{13}$C-NMR analysis by Triad Sequence analysis according to the Randall method [Journal of Polymer Science: Polymer Physics edition, 1973, 11, 275~287] and the Kakugo method [Macromolecules 1982, 15, 1150]. Based on the equations of Re=k11/k12 and Rc=k22/k21, the Re*Rc value was calculated.

The Re*Rc value of each copolymer is also shown in the following Table 2.

TABLE 2

| | Content of ethylene wt % | Crystallization temperature K | Crystallization enthalpy J/g | Re * Rc |
|---|---|---|---|---|
| Example 1 | 51.7 | 239.87 | 3.91 | 0.650 |
| Example 2 | 52.2 | 238.40 | 4.36 | 0.803 |
| Example 3 | 54.2 | 249.44 | 8.82 | 0.848 |
| Example 4 | 54.5 | 245.89 | 7.65 | 0.563 |
| Example 5 | 56.9 | 255.68 | 12.21 | 0.942 |
| Example 6 | 57.1 | 258.68 | 13.18 | 0.843 |
| Example 7 | 62.6 | 272.52 | 19.39 | 0.927 |
| Example 8 | 69.1 | 291.42 | 27.97 | 0.987 |
| Example 9 | 69.6 | 293.13 | 30.23 | 0.816 |
| Comparative Example 1 | 47.1 | 238.48 | 1.39 | 1.608 |
| Comparative Example 2 | 47.2 | 237.86 | 5.48 | 1.341 |
| Comparative Example 3 | 51.2 | 252.06 | 10.69 | 1.449 |
| Comparative Example 4 | 69.9 | 300.59 | 35.41 | 1.516 |

Referring to Table 2 and FIGS. 1 and 2, the copolymers of Examples 1 to 9 showed that the ethylene content x and the crystallization temperature y satisfied the relationship of $2.628x+100 \leq y \leq 2.628x+112$, the ethylene content x and the crystallization enthalpy z satisfied the relationship of $1.55x-80.00 \leq z \leq 1.55x-75.00$, and Re*Rc was less than 1.

In contrast, the copolymers of Comparative Examples 1 to 4 showed that the copolymers having the ethylene content similar to those of the examples exhibited higher crystallization temperature so as to not satisfy the relationship of $2.628x+100 \leq y \leq 2.628x+112$, and Re*Rc was greater than 1.

These results suggest that the elastic terpolymers of Examples 1 to 9 show a uniform alternate distribution of monomers in the polymer chains, thereby having low crystallization temperature with respect to the ethylene content, and superior low-temperature properties, elasticity, and flexibility to those of the comparative examples.

The invention claimed is:

1. An elastic terpolymer, which is a copolymer of ethylene, an alpha-olefin having 3 to 20 carbon atoms, and a diene, obtained in the presence of a Group IV transition metal catalyst, wherein
   i) its weight average molecular weight measured by GPC is 100,000 to 500,000, and
   ii) x which is the ethylene content (% by weight) and y which is the crystallization temperature (K) of the copolymer measured when the ethylene content is X satisfy a relationship of $2.628x+100 \leq y \leq 2.628x+112$.

2. The elastic terpolymer of claim 1, wherein x which is the ethylene content (% by weight) and z which is crystallization enthalpy ($\Delta Hc$; J/g) measured by DSC when the ethylene content is X (% by weight) satisfy a relationship of $1.55x-80.00 \leq z \leq 1.55x-75.00$.

3. The elastic terpolymer of claim 1, wherein Re*Rc is less than 1, in which Re*Rc is a product of a reactivity ratio Re representing the distribution of ethylene in the copolymer and a reactivity ratio Rc representing the distribution of alpha-olefin in the copolymer, and
   Re=k11/k12 and Rc=k22/k21, wherein k11 is a growth reaction rate constant when ethylene binds next to ethylene in the copolymer chain, k12 is a growth reaction rate constant when alpha-olefin binds next to ethylene in the copolymer chain, k21 is a growth reaction rate constant when ethylene binds next to alpha-olefin in the copolymer chain, and k22 is a growth reaction rate constant when alpha-olefin binds next to alpha-olefin in the copolymer chain.

4. The elastic terpolymer of claim 3, wherein, Re*Rc is 0.60 to 0.99.

5. The elastic terpolymer of claim 1, wherein the copolymer of ethylene, an alpha-olefin having 3 to 20 carbon atoms, and a diene is a copolymer of 40 to 80% by weight of ethylene, 15 to 55% by weight of the alpha-olefin having 3 to 20 carbon atoms, and 0.5 to 9% by weight of the diene.

6. The elastic terpolymer of claim 1, wherein the elastic terpolymer has a density of 0.840 to 0.895 g/cm$^3$.

7. The elastic terpolymer of claim 1, wherein the elastic terpolymer has Mooney viscosity (1+4@125° C.) of 5 to 180.

8. The elastic terpolymer of claim 1, wherein the elastic terpolymer has a molecular weight distribution of 2 to 4.

9. The elastic terpolymer of claim 1, wherein alpha-olefin is one or more selected from the group consisting of propylene, 1-butene, 1-hexene and 1-octene, and diene is one or more selected from the group consisting of 5-ethylidene-2-norbornene, 5-methylene-2-norbornene and 4-hexadiene.

10. A method for preparing the elastic terpolymer of claim 1, comprising the step of continuously feeding a monomer composition containing 40 to 80% by weight of ethylene, 15 to 55% by weight of an alpha-olefin having 3 to 20 carbon atoms, and 0.5 to 9% by weight of a diene to a reactor to perform copolymerization in the presence of a catalytic composition including a first transition metal compound represented by the following Chemical Formula 1 and a second transition metal compound represented by the following Chemical Formula 2:

[Chemical Formula 1]

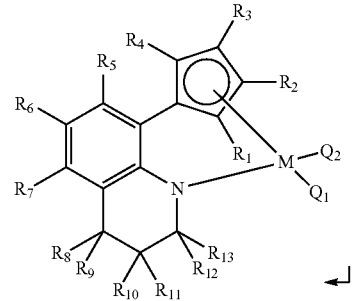

[Chemical Formula 2]

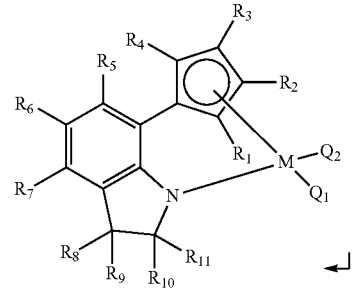

wherein $R_1$ to $R_{13}$ are the same as or different from each other, and are each independently hydrogen, an alkyl radical having 1 to 20 carbon atoms, an alkenyl radical having 2 to 20 carbon atoms, an aryl radical having 6 to 20 carbon atoms, a silyl radical; an alkylaryl radical having 7 to 20 carbon atoms, an arylalkyl radical having 7 to 20 carbon atoms, or a hydrocarbyl-substituted metalloid radical of a Group IV metal; of $R_1$ to $R_{13}$, two different neighboring groups are connected to each other by an alkylidine radical containing an alkyl having 1 to 20 carbon atoms or an aryl radical having 6 to 20 carbon atoms to form an aliphatic or aromatic ring;

M is a Group IV transition metal; and $Q_1$ and $Q_2$ are the same as or different from each other, and are each independently a halogen radical, an alkyl radical having 1 to 20 carbon atoms, an alkenyl radical having 2 to 20 carbon atoms, an aryl radical having 6 to 20 carbon atoms, an alkylaryl radical having 7 to 20 carbon atoms, an arylalkyl radical having 7 to 20 carbon atoms, an alkylamido radical having 1 to 20 carbon atoms, an arylamido radical having 6 to 20 carbon atoms, or an alkylidene radical having 1 to 20 carbon atoms.

11. The method of claim 10, wherein the first transition metal compound is one or more selected from the group consisting of the following compounds:

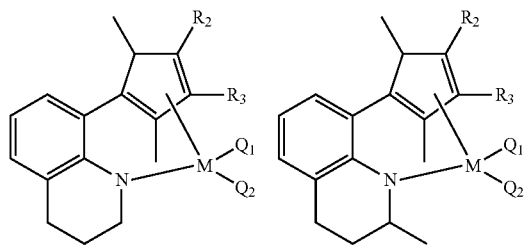
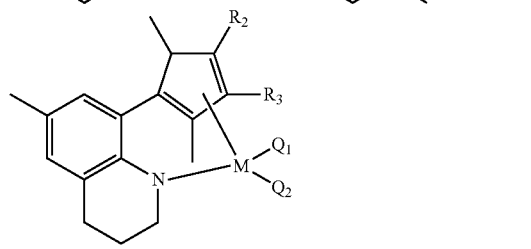
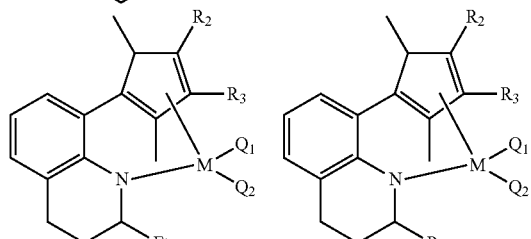
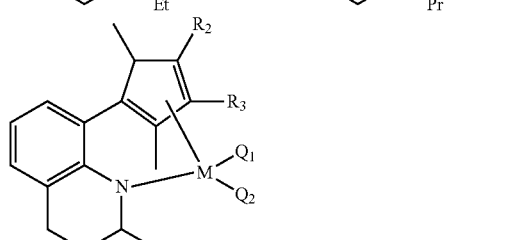
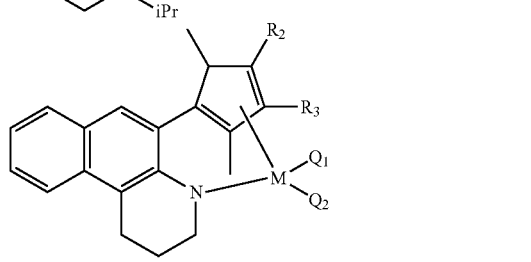
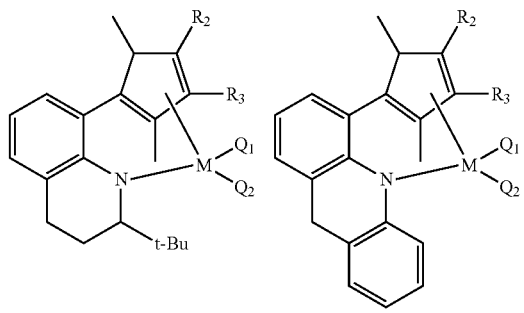
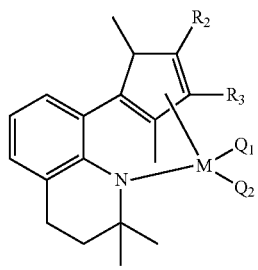
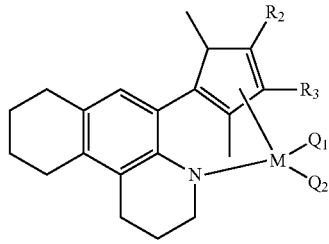
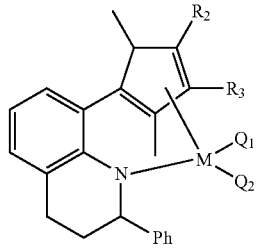

wherein $R_2$ and $R_3$ are the same as or different from each other and are each independently hydrogen or a methyl radical, M is a Group IV transition metal, and $Q_1$ and $Q_2$ are the same as or different from each other and are each independently a methyl radical, a dimethylimido radical, or a chlorine radical.

12. The method of claim 10, wherein the second transition metal compound is one or more selected from the group consisting of the following compounds:

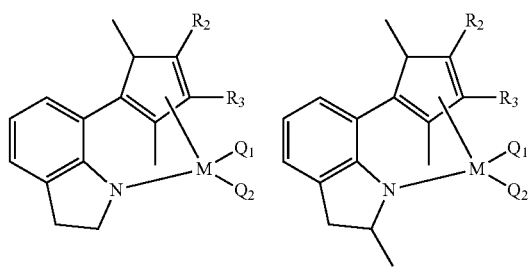

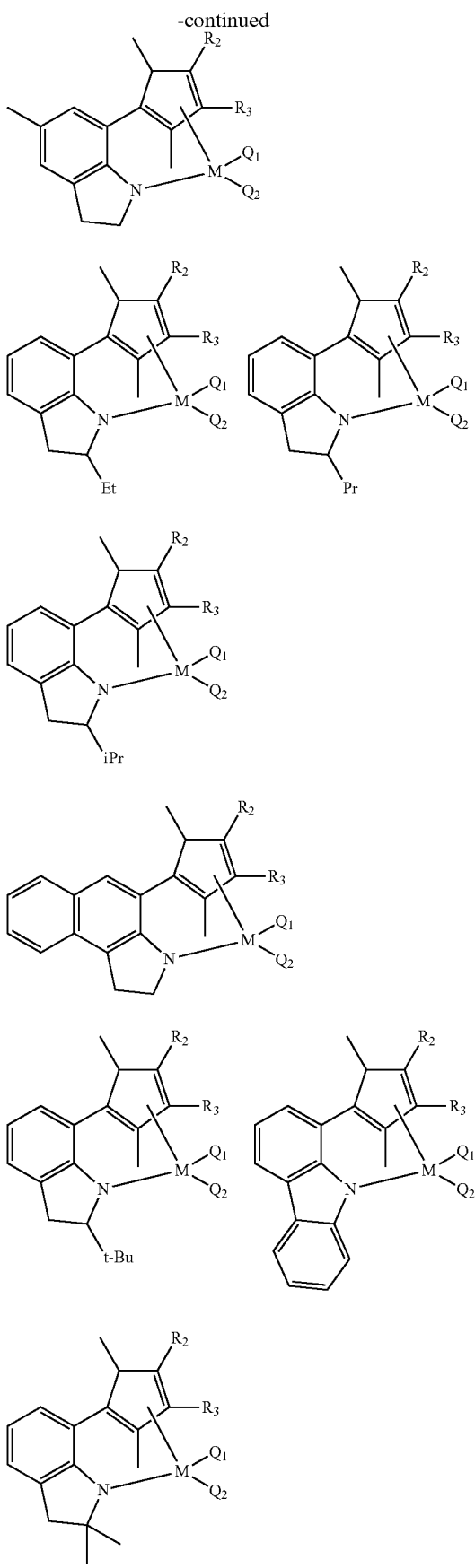

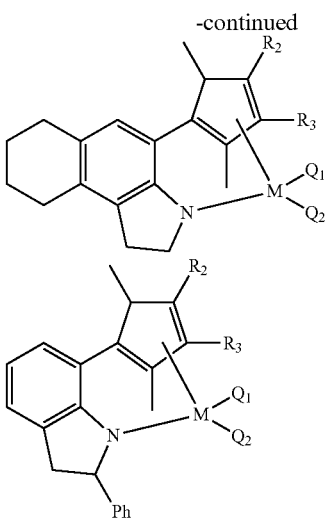

wherein $R_2$ and $R_3$ are the same as or different from each other and are each independently hydrogen or a methyl radical, M is a Group IV transition metal, and $Q_1$ and $Q_2$ are the same as or different from each other and are each independently a methyl radical, a dimethylimido radical, or a chlorine radical.

13. The method of claim 10, wherein the catalytic composition further includes one or more co-catalytic compounds selected from the group consisting of the following Chemical Formula 3, Chemical Formula 4, and Chemical Formula 5:

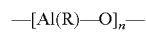  [Chemical Formula 3]

wherein R's are the same as or different from each other and are each independently a halogen, a hydrocarbon having 1 to 20 carbon atoms, or a halogen-substituted hydrocarbon having 1 to 20 carbon atoms, and n is an integer of 2 or more;

  [Chemical Formula 4]

wherein R is the same as defined in Chemical Formula 3, and D is aluminum or boron; and

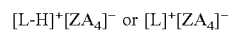  [Chemical Formula 5]

wherein L is a neutral or cationic Lewis acid, H is a hydrogen atom, Z is an element of Group 13, and A's are the same as or different from each other and are each independently an aryl group having 6 to 20 carbon atoms or an alkyl group having 1 to 20 carbon atoms, in which one or more hydrogen atoms are unsubstituted or substituted with a halogen, a hydrocarbon having 1 to 20 carbon atoms, an alkoxy, or a phenoxy.

14. The method of claim 10, wherein the alpha-olefin is one or more selected from the group consisting of propylene, 1-butene, 1-hexene, and 1-octene, and the diene is one or more selected from the group consisting of 5-ethylidene-2-norbornene, 5-methylene-2-norbornene, and 4-hexadiene.

15. The method of claim 10, wherein copolymerization is performed while continuously feeding the monomer composition, the first and second transition metal compounds, and the co-catalyst in a solution state to a reactor.

16. The method of claim 15, wherein the copolymerization step is continuously performed while continuously discharging the copolymerized elastic terpolymer from the reactor.

17. The method of claim 10, wherein the copolymerization step is performed at a temperature of 100 to 170° C.

* * * * *